(12) United States Patent
Kabumoto et al.

(10) Patent No.: US 6,396,410 B1
(45) Date of Patent: May 28, 2002

(54) IMAGE FORMING APPARATUS

(75) Inventors: Masaaki Kabumoto, Chiba; Kazuyoshi Yamada, Kanagawa, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/421,382

(22) Filed: Oct. 20, 1999

(30) Foreign Application Priority Data

Oct. 21, 1998 (JP) .......................................... 10-319827

(51) Int. Cl.[7] .................................................. G08B 5/00
(52) U.S. Cl. ............................ 340/815.65; 340/815.4; 358/305; 358/441; 40/573
(58) Field of Search ..................... 340/815.65, 815.4, 340/815.43, 525; 358/305, 441; 40/558, 573, 605

(56) References Cited

U.S. PATENT DOCUMENTS

| 3,790,772 A | * | 2/1974 | Newman et al. ............... 40/558 |
| 4,167,322 A | * | 9/1979 | Yano et al. ................... 340/524 |
| 5,245,385 A | | 9/1993 | Fukumizu et al. ........... 355/202 |
| 5,289,147 A | | 2/1994 | Koike et al. ................. 355/200 |
| 5,367,363 A | | 11/1994 | Kai et al. ..................... 355/210 |
| 5,400,123 A | | 3/1995 | Sato et al. .................... 355/218 |
| 5,630,195 A | | 5/1997 | Sawayama et al. .......... 355/246 |
| 5,648,842 A | | 7/1997 | Sekine et al. ................ 355/350 |
| 5,761,570 A | | 6/1998 | Sawayama et al. ............ 399/49 |
| 5,818,343 A | * | 10/1998 | Sobel et al. ............ 340/815.65 |
| 5,860,038 A | | 1/1999 | Kato et al. ...................... 399/49 |
| RE36,301 E | | 9/1999 | Kai et al. ..................... 399/113 |
| 6,055,386 A | | 4/2000 | Kato et al. ...................... 399/49 |
| 6,057,936 A | | 5/2000 | Obara et al. ................. 358/296 |
| 6,125,257 A | | 9/2000 | Sekine et al. ................ 399/343 |
| 6,144,363 A | * | 11/2000 | Alloul et al. ................. 345/117 |
| 6,160,569 A | | 12/2000 | Fujimori et al. ............. 347/262 |
| 6,226,475 B1 | | 5/2001 | Kabumoto et al. .......... 399/107 |
| 6,259,866 B1 | | 7/2001 | Kabumoto et al. ............. 399/1 |
| 6,304,739 B1 | | 10/2001 | Katsuyama et al. ......... 399/262 |

FOREIGN PATENT DOCUMENTS

| JP | 9-269705 | 10/1997 |
| JP | 10-319793 | 12/1998 |

* cited by examiner

Primary Examiner—Donnie L. Crosland
(74) Attorney, Agent, or Firm—Oblon, Spivak, McClelland, Maier & Neustadt, P.C.

(57) ABSTRACT

An image forming apparatus includes a display block made up of two pairs of lamp units of different colors alternating with each other. The display block has its top divided into four rectangles by a cross; nearby rectangles are different in color from each other. The four sides of the display block each are vertically divided into two portions. The two portions of each side respectively share the same colors with the rectangles of the top contiguous therewith. The apparatus allows a person to see its operating status being indicated by the display block anywhere in any direction without any dead angle.

4 Claims, 3 Drawing Sheets

IMAGE FORMING APPARATUS

BACKGROUND OF THE INVENTION

The present invention relates to a copier, printer, facsimile apparatus or similar image forming apparatus and more particularly to an image forming apparatus allowing even a person remote from the apparatus to see its operating status Today, image forming apparatuses including copiers, printers and facsimile apparatuses are commonplace equipment in offices. As for the environment of use of an image forming apparatus, a problem is that a person remote from the apparatus cannot easily see its operating status. This is particularly true with a copier spreading far more remarkably than the other image forming apparatuses.

Environments in which copiers are installed may generally be classified into two kinds, e.g., a distributed environment in which a copier is located at one place of an office to be handled by any person, and a centralized environment in which a plurality of copiers are centralized to be handled by an exclusive operator. The distributed environment appears to be predominant over the centralized environment as far as usual offices are concerned. In any case, however, a person intending to use a copier cannot see its operating status unless walking up all the way to the copier. The person often finds that the copier is outputting a great number of copies or is not usable due to a paper jam or similar error only when reached the copier.

As for the centralized environment, a single operator is, in many cases, in charge of several copiers and cannot see the operating statuses of the copiers other than the currently operating one unless the operator actually walks up to them. In this manner, while a person can easily see the operating status of a copier via an operation panel mounted on the copier if standing by the copier, the person cannot see the operation panel and therefore the operating status at a position even slightly spaced from the copier.

In light of the above, Japanese Patent Laid-Open Publication No. 8-297440, for example, proposes a copier including a pair of lamps located at a higher level than the top of a copier body. The lamps each are capable of glowing in a particular color and positioned such that they are visible from a range of 80 degrees or more around the copier body. By causing the lamps to glow in different colors and selectively causing them to turn on, turn off or blink, it is possible to show even a person remote from the copier body the operating status of the copier body.

The above conventional copier, however, involves a dead angle.

Specifically, the operating status of the copier body cannot be identified at all or is extremely difficult to identify at a position where the lamps appear in alignment or only slightly deviated from each other. That is, it is not always possible for a person to see both of the lamps over the range of 360 degrees.

Technologies relating to the present invention are also disclosed in, e.g., Japanese Patent Laid-Open Publication Nos. 9-269705 and 10-319793.

SUMMARY OF THE INVENTION

It is therefore an object of the present invention to provide an image forming apparatus allowing even a person remote from the apparatus to surely see the operating status of the apparatus at a glance without regard to the viewing direction.

An image forming apparatus capable of allowing a person around the apparatus to see its operating status of the present invention includes an apparatus body, and a display section mounted on the apparatus body at a level high enough for the person to see the display section. The display section has an outer periphery visible from a range around the apparatus body and divided such that the display section shows at least two divided portions of different colors thereof when seen in any direction. Two nearby divided portions each are capable of glowing in a particular color.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
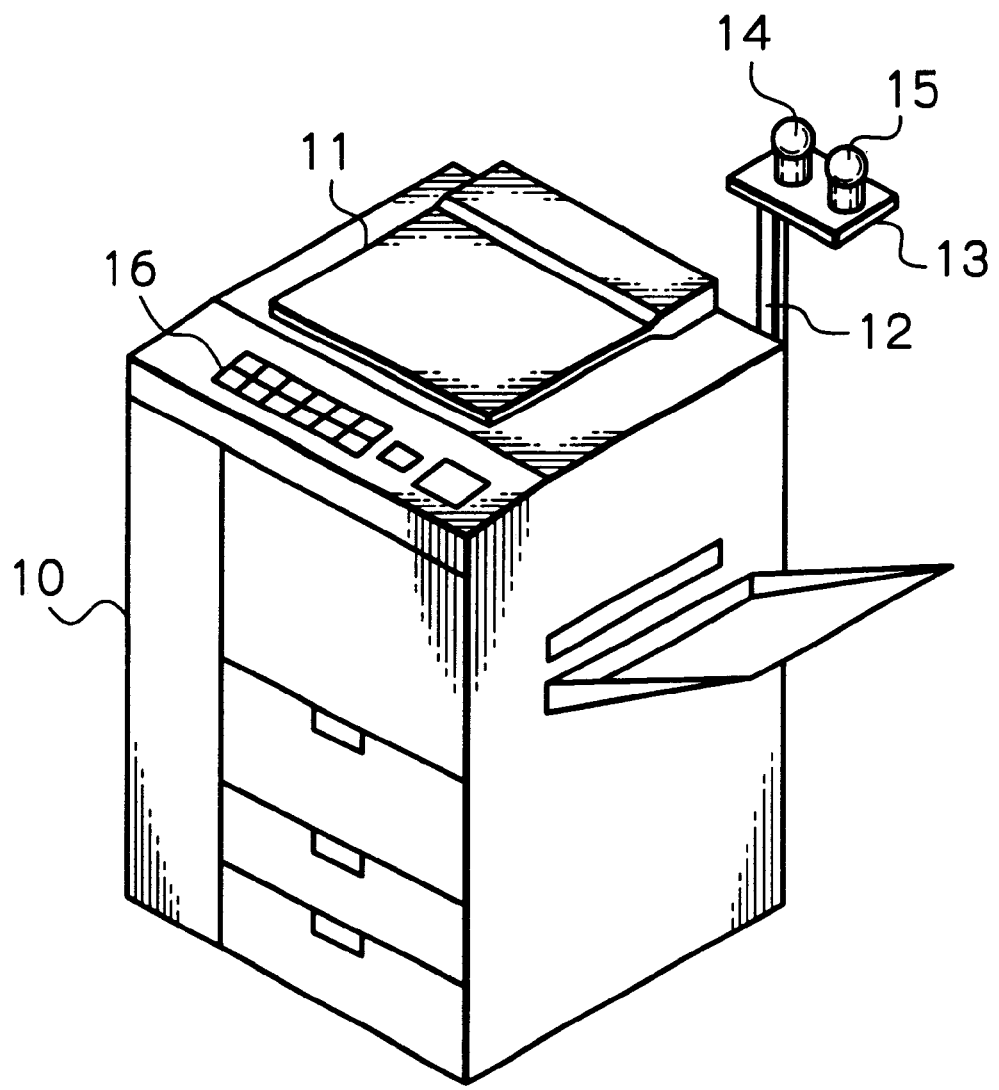
FIG. 1 is an isometric view showing a conventional image forming apparatus.

To better understand the present invention, brief reference will be made to a conventional copier, shown in FIG. 1. The copier to be described is taught in Japanese Patent Laid-Open Publication No. 8-297440 mentioned earlier. As shown, the copier includes a copier body 10 and a lamp base 13 supported by a post 12 which is mounted on the copier body 10. The lamp base 13 is positioned at a higher level than the top of the body 10, more specifically the top of a cover plate 11. A pair of lamps 14 and 15 each being capable of glowing in a particular color are mounted on the lamp base 13 such that they are visible from a range of 80 degrees or more around the body 10. The reference numeral 16 designates an operation panel.

The above document describes that the lamps 14 and 15 are visible from a range of 360 degrees when the copier body 10 is located at the center of a room or from a range of 180 degrees when it is positioned against the wall of a room. In addition, the document teaches that by causing the lamps 14 and 15 to glow in different colors and selectively causing them to turn on, turn off or blink, it is possible to show even a person remote from the body copier 10 the operating status of the body 10.

The above copier, however, involves a dead angle, as stated earlier. Specifically, the operating status of the copier body 10 cannot be identified at all or is extremely difficult to identify at a position where the lamps 14 and 15 appear in alignment or only slightly deviated from each other. Stated another way, it is not always possible for a person to see both of the lamps 14 and 15 over the range of 360 degrees.

Figure 2:
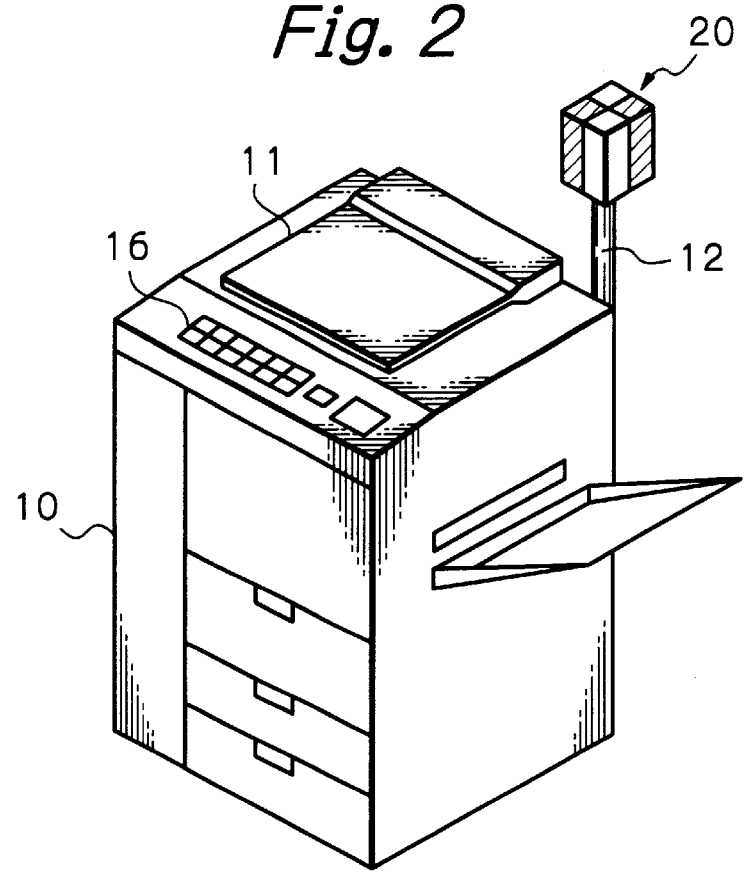
FIG. 2 is an isometric view showing an image forming apparatus embodying the present invention.

Referring to FIG. 2, an image forming apparatus embodying the present invention is shown and implemented as a copier by way of example. In FIG. 2, structural elements identical with the structural elements of FIG. 1 are designated by identical reference numerals and will not be described specifically in order to avoid redundancy. As shown, a post 12 is mounted on a copier body 10 and supports a two-color display block 20 at a level higher than the top of the copier body 10. The display block 20 has a dice-like configuration.

Figure 3A:
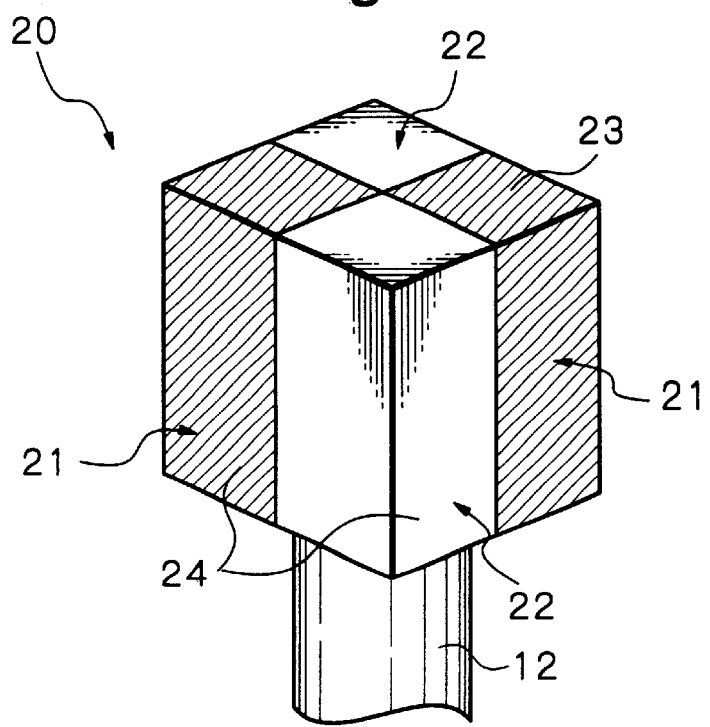
FIG. 3A is an enlarged isometric view of a display block included in the illustrative embodiment.

As shown in FIG. 3A in detail, the display block 20 is made up of two pairs of small columnar lamp units 21 and 22 alternating with each other. The lamp units 21 and lamp units 22 each are capable of glowing in a particular color. The display block 20 with this configuration has a top 23 divided into four rectangles by a cross; nearby rectangles are different in color from each other. In addition, the display block 20 has four sides 24 each being vertically divided into two portions. The two portions of each side 24 share the same colors as the rectangles of the top 23 contiguous therewith, as illustrated. The lamp units 21 and 22 are identical with each other except for color although not shown in detail. Of course, the lamp units 21 and 22 may glow in any desired colors so long as the colors can be distinguished from each other by eye.

When a person around the copier body 10 sees the above display block 20 in any desired direction, the person can see at least two divided portions of different colors of the block 20 without fail. For example, a person present at a position where only one side 24 is visible can see two lamp units 21 and 22 of different colors adjoining each other on the side 24. A person present at a position where two sides 24 are visible can see two lamp units 21 and two lamp units 22 in an alternating array. In addition, the top 23 always appears in the form of a combination of four rectangles. In this manner, a person can always see at least one lamp unit 21 and at least one lamp unit 22. The illustrative embodiment is therefore free from a dead angle.

The post 12 supports the display block 20 at a level higher than the top of a cover plate 11, as stated earlier. However, the post 12 may be mounted on the body copier 10 at any desired position so long as it does not interfere with the operator's manipulation including the opening and closing of the cover plate 11 and the operation of the operation panel 16, as in the conventional copier.

Assume that one of the lamp units 21 and lamp units 22 glows in green while the other of them glows in red. Then, the green lamp units may show the stand-by or ready status of the copier body 10 when glowing while the red lamp units may show the copying status of the body 10. In addition, the red lamp units may show any error occurred in the copier body 10, e.g., the absence of papers, a paper jam or short toner. Of course, this kind of display is only illustrative and may be suitably changed to the user's taste. Further, the colors of the lamp units 21 and 22 may be combined with the tun-on, turn-off and blinking of the same. This can be done with any one of conventional control means.

Figure 3B:
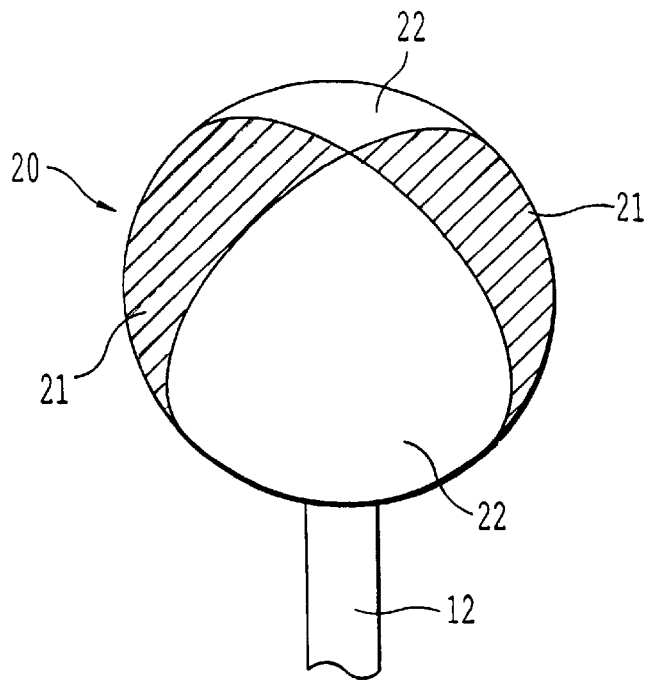
FIG. 3B is an enlarged view of a spherical display block.
Figure 3C:
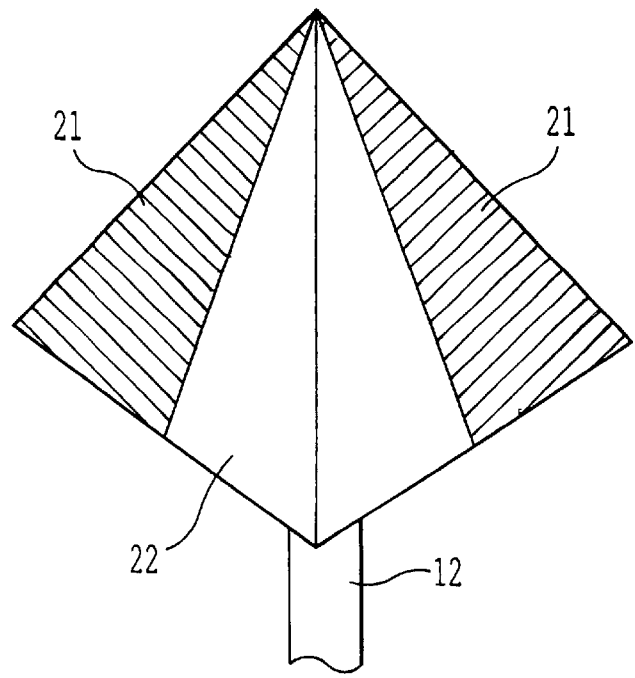
FIG. 3C is an enlarged view of a pyramidal display block.

The display block 20 may be implemented as a triangular, quadrangular or similar pyramid in place of the above cube, in which case lamp units of different colors will also be combined in such a manner as to bisect each side. The display block 20 may even be implemented as a sphere, in which case lamp units of different colors will be alternately arranged such that two or more portions of the block are visible in any direction. FIGS. 3B and 3C show respectively the spherical and pyramidal display blocks.

In summary, it will be seen that the present invention provides an image forming apparatus allowing, when installed in an office, a person to see its operating status anywhere in any direction. This makes it needless for the person to walk up all the way to the apparatus for checking its operating status. A cubic, pyramidal, spherical or similar display block mounted on the apparatus allows portions thereof assigned to a particular to share the same lamps, same structure and so forth. In addition, even portions different in color from each other can share the same structural members.

Various modifications will become possible for those skilled in the art after receiving the teachings of the present disclosure without departing from the scope thereof.

What is claimed is:

1. An image forming apparatus for viewing an operating status thereof, comprising:
   an apparatus body; and
   a display section mounted on said apparatus body at a level high enough for a person to see said display section,
   wherein said display section has an outer periphery visible from a range around said apparatus body and comprises:
   at least two divided portions of different colors visible in any direction, at least one of said divided portions including two proximate portions each configured with a particular color.

2. An apparatus as claimed in claim 1, wherein said display section has a cubic configuration including:
   a top divided into four rectangles with two proximate rectangles of said four rectangles being different in color,
   wherein said cubic configuration includes four vertical sides each being vertically divided into two portions, respectively sharing identical colors with the two proximate rectangles of the top.

3. An apparatus as claimed in claim 1, wherein said display section is pyramidal and has sides each being divided into two portions.

4. An apparatus as claimed in claim 1, wherein said displays section is spherical.

* * * * *